(12) United States Patent
Yamamoto et al.

(10) Patent No.: US 9,508,989 B2
(45) Date of Patent: Nov. 29, 2016

(54) POSITIVE ELECTRODE MATERIAL FOR LITHIUM ION SECONDARY BATTERIES, POSITIVE ELECTRODE FOR LITHIUM ION SECONDARY BATTERIES, LITHIUM ION SECONDARY BATTERY, AND METHOD OF PRODUCING POSITIVE ELECTRODE MATERIAL FOR LITHIUM ION SECONDARY BATTERIES

(71) Applicant: SUMITOMO OSAKA CEMENT CO., LTD., Chiyoda-ku, Tokyo (JP)

(72) Inventors: Kazuyo Yamamoto, Tokyo (JP); Ryuuta Yamaya, Tokyo (JP); Satoru Oshitari, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/796,432

(22) Filed: Jul. 10, 2015

(65) Prior Publication Data

US 2016/0293942 A1     Oct. 6, 2016

(30) Foreign Application Priority Data

Mar. 31, 2015    (JP) ................. 2015-073797

(51) Int. Cl.
| | |
|---|---|
| *H01M 4/133* | (2010.01) |
| *H01M 4/36* | (2006.01) |
| *H01M 4/136* | (2010.01) |
| *H01M 4/58* | (2010.01) |
| *H01M 10/0525* | (2010.01) |
| *C01B 25/45* | (2006.01) |
| *H01M 4/62* | (2006.01) |
| *H01M 4/04* | (2006.01) |
| *H01M 4/02* | (2006.01) |

(52) U.S. Cl.
CPC ............ *H01M 4/366* (2013.01); *C01B 25/45* (2013.01); *H01M 4/0404* (2013.01); *H01M 4/0407* (2013.01); *H01M 4/136* (2013.01); *H01M 4/5825* (2013.01); *H01M 4/625* (2013.01); *H01M 10/0525* (2013.01); *C01P 2006/40* (2013.01); *H01M 2004/028* (2013.01)

(58) Field of Classification Search
CPC ............ H01M 4/366; H01M 4/0404; H01M 4/0407; H01M 4/136; H01M 4/5825; H01M 4/625

USPC ........................................................ 429/221
See application file for complete search history.

(56) References Cited

U.S. PATENT DOCUMENTS

| | | | |
|---|---|---|---|
| 2002/0102459 A1* | 8/2002 | Hosoya et al. | ............... 429/221 |
| 2010/0297496 A1 | 11/2010 | Ravet et al. | |
| 2013/0266843 A1* | 10/2013 | Hara et al. | ................... 429/149 |

FOREIGN PATENT DOCUMENTS

| | | |
|---|---|---|
| EP | 2612839 A1 | 7/2013 |
| JP | A-2014-060142 | 4/2014 |
| JP | A-2014-146513 | 8/2014 |
| JP | A-2014-179292 | 9/2014 |
| JP | A-2014-209463 | 11/2014 |
| JP | A-2015-049996 | 3/2015 |
| JP | A-2015-060799 | 9/2015 |
| WO | WO 2013/146168 A1 | 10/2013 |
| WO | WO 2014/174952 A1 | 10/2014 |

OTHER PUBLICATIONS

European Search Report for European Patent Application No. 15173168.4 (mailed Oct. 15, 2015).
Padhi et al., "Phospho-olivines as Positive-Electrode Materials for Rechargeable Lithium Batteries," *J. Electrochem. Soc.*, 144(4): 1188-1194 (1997).
ISO 11664-4:2008(E) (Colorimetry-Part 4: CIE 1976 L*a*b* Colour space (Nov. 1, 2008).
Office Action for Japanese Patent Application No. 2015-073797 (mailed Jul. 14, 2015).

* cited by examiner

*Primary Examiner* — James Lee
(74) *Attorney, Agent, or Firm* — Merchant & Gould P.C.

(57) ABSTRACT

To provide a positive electrode material for lithium ion secondary batteries capable of reducing waste loss, a method of producing the same, a positive electrode for lithium ion secondary batteries and a lithium ion secondary battery which contain the above-described positive electrode material for lithium ion secondary batteries. A positive electrode material for lithium ion secondary batteries, wherein the positive electrode material includes inorganic particles whose surfaces are coated with a carbonaceous film, the inorganic particles being represented by a formula $LiFe_xMn_{1-x-y}M_yPO_4$ ($0.05 \leq x \leq 1.0$, $0 \leq y \leq 0.14$, where M represents at least one selected from the group consisting of Mg, Ca, Co, Sr, Ba, Ti, Zn, B, Al, Ga, In, Si, Ge, and rare earth elements), a specific surface area is 6 m²/g to 20 m²/g, a lightness $L^*$ is 0 to 40, and a chroma $C^*$ is 0 to 3.5.

3 Claims, No Drawings

US 9,508,989 B2

POSITIVE ELECTRODE MATERIAL FOR LITHIUM ION SECONDARY BATTERIES, POSITIVE ELECTRODE FOR LITHIUM ION SECONDARY BATTERIES, LITHIUM ION SECONDARY BATTERY, AND METHOD OF PRODUCING POSITIVE ELECTRODE MATERIAL FOR LITHIUM ION SECONDARY BATTERIES

CROSS-REFERENCE TO RELATED APPLICATIONS

This application claims the benefit of priority to Japanese Patent Application No. 2015-073797, filed Mar. 31, 2015, the disclosure of which is hereby incorporated by reference in its entirety.

TECHNICAL FIELD

The present invention relates to a positive electrode material for lithium ion secondary batteries, a positive electrode for lithium ion secondary batteries, a lithium ion secondary battery, and a method of producing a positive electrode material for lithium ion secondary batteries.

BACKGROUND ART

Recently, as a small, light-weight, and high-capacity battery, non-aqueous electrolytic solution secondary batteries such as a lithium ion secondary battery have been proposed and put into practice.

A lithium ion secondary battery has lighter weight, smaller size, and higher energy as compared to other secondary batteries of the related art such as a lead battery, a nickel-cadmium battery, or a nickel-metal hydride battery. Therefore, a lithium ion secondary battery is preferably used as a power supply of a portable electronic apparatus such as a mobile phone or a laptop computer. In addition, a lithium ion secondary battery is considered as a high-output power supply for an electric vehicle, a hybrid vehicle, an electric tool, or the like. In a lithium ion secondary battery used as the high-output power supply, high-speed charge and discharge characteristics are required for an electrode active material.

Regarding the development of a lithium ion secondary battery, a rare metal-free electrode active material is considered from the viewpoint of obtaining high performance, high capacity, and low cost, and various materials are studied. Among these, an olivine-type phosphate electrode active material represented by lithium iron phosphate ($LiFePO_4$) has attracted attention as an electrode active material which has high safety, is abundant in resource, and is inexpensive.

Among phosphate electrode active materials, lithium manganese phosphate ($LiMnPO_4$) containing Li as an alkali metal and Mn as a transition metal or lithium cobalt phosphate ($LiCoPO_4$) containing Co as a transition metal is known to have a theoretical capacity of about 170 mAh/g which is equivalent to that of $LiFePO_4$. However, it has been said that lithium manganese phosphate or lithium cobalt phosphate has a problem of significantly poor utilization rate under low-rate discharge conditions as compared to $LiFePO_4$ (for example, refer to Non-Patent Document 1).

RELATED ART DOCUMENT

Patent Document

[Non-Patent Document 1] A. K. Padhi, K. S. Nanjundaswamy, and J. B. Goodenough, J. Electrochem. Soc., Vol. 144, No. 4, 1 30 pp. 188-1193 (1997)

DISCLOSURE OF THE INVENTION

Problem that the Invention is to Solve

The above-described phosphate electrode active material is insufficient in electron conductivity. Therefore, in a lithium ion secondary battery in which the phosphate electrode active material is used as a positive electrode active material, various actions are taken to realize high-current charge and discharge, for example, refinement of electrode active material particles or formation of a complex of an electrode active material and a conductive material.

The phosphate electrode active material has low electron conductivity and thus is coated with carbon to ensure electron conductivity as a battery material. When the phosphate electrode active material is coated with carbon, electron conductivity is improved and, therefore characteristics as a battery material are improved. However, in the lithium ion secondary battery in which the phosphate electrode active material is used, it is known that, when the phosphate electrode active material is insufficiently coated with carbon, battery characteristics are decreased.

Such a decrease of an electrode active material may be discovered by investigating battery characteristics of a lithium ion secondary battery after the construction of the lithium ion secondary battery. In this case, it is necessary to waste the entire battery, and there is a problem in that waste loss increases.

It is desirable to investigate a carbon coating state in a phosphate electrode active material in advance such that battery characteristics of a lithium ion secondary battery can be estimated before the construction of the lithium ion secondary battery. However, currently, it is difficult to measure a carbon coating state in a phosphate electrode active material before the construction of a lithium ion secondary battery.

Therefore, even phosphate electrode active materials, which are determined to have equivalent characteristics when the amounts of carbon coated are compared, include a good product capable of realizing good battery characteristics and a bad product having bad battery characteristics due to a poorer carbon coating state than that of the good product. This problem is one of the factors which increase waste loss.

The present invention has been made in consideration of the above-described circumstances, and an object thereof is to provide a positive electrode material for lithium ion secondary batteries capable of reducing waste loss; and a method of producing the same. In addition, another object is to provide a positive electrode for lithium ion secondary batteries and a lithium ion secondary battery which contain the above-described positive electrode material for lithium ion secondary batteries.

Means for Solving the Problem

As a result of thorough investigation to solve the above-described problems, the present inventors found that the waste loss can be reduced by a positive electrode material for lithium ion secondary batteries which includes inorganic particles whose surfaces are coated with a carbonaceous film, the inorganic particles being represented by a formula $LiFe_xMn_{1-x-y}M_yPO_4$ ($0.05 \leq x \leq 1.0$, $0 \leq y \leq 0.14$, where M represents at least one selected from the group consisting of Mg, Ca, Co, Sr, Ba, Ti, Zn, B, Al, Ga, In, Si, Ge, and rare earth elements), a specific surface area is in a range from 6 $m^2/g$ to 20 $m^2/g$, a lightness $L^*$ is in a range from 0 to 40, and a chroma $C^*$ is in a range from 0 to 3.5. Based on this finding, the present invention has been completed.

According to a first aspect of the present invention, there is provided a positive electrode material for lithium ion secondary batteries, the positive electrode material including inorganic particles whose surfaces are coated with a carbonaceous film, the inorganic particles being represented by a formula $LiFe_xMn_{1-x-y}M_yPO_4$ ($0.05 \leq x \leq 1.0$, $0 \leq y \leq 0.14$, where M represents at least one selected from the group consisting of Mg, Ca, Co, Sr, Ba, Ti, Zn, B, Al, Ga, In, Si, Ge, and rare earth elements), the positive electrode material has a specific surface area in a range from 6 $m^2/g$ to 20 $m^2/g$, a lightness $L^*$ in a range from 0 to 40, and a chroma $C^*$ in a range from 0 to 3.5.

According to a second aspect of the present invention, there is provided a positive electrode for lithium ion secondary batteries, the positive electrode including: a current collector; and a positive electrode mixture layer that is formed on the current collector, in which the positive electrode mixture layer contains the positive electrode material for lithium ion secondary batteries according to the first aspect.

According to a third aspect of the present invention, there is provided a lithium ion secondary battery including the positive electrode for lithium ion secondary batteries according to the second aspect.

According to a fourth aspect of the present invention, there is provided a method of producing a positive electrode material for lithium ion secondary batteries, the method including: a first step of heating a liquid material in an airtight container, the liquid material containing a Li compound, an Fe compound, a Mn compound, an M compound (where M represents at least one selected from the group consisting of Mg, Ca, Co, Sr, Ba, Ti, Zn, B, Al, Ga, In, Si, Ge, and rare earth elements) and at least one of a P compound and a S compound.

Advantage of the Invention

In the positive electrode material for lithium ion secondary batteries according to the first aspect, whether or not the positive electrode material exhibits good battery characteristics can be evaluated by measuring the specific surface area, the lightness $L^*$, and the chroma $C^*$. Therefore, the number of batteries wasted in a test after the construction can be reduced.

The positive electrode for lithium ion secondary batteries according to the second aspect includes the positive electrode material for lithium ion secondary batteries according to the first aspect. Therefore, a highly reliable lithium ion secondary battery can be manufactured.

The lithium ion secondary battery according to the third aspect includes the positive electrode for lithium ion secondary batteries according to the second aspect. Therefore, the battery has good battery characteristics and high reliability.

With the method of producing a positive electrode material for lithium ion secondary batteries according to the fourth aspect, a positive electrode material for lithium ion secondary batteries can be easily produced which is capable of manufacturing a good lithium ion secondary battery.

BEST MODE FOR CARRYING OUT THE INVENTION

A positive electrode material for lithium ion secondary batteries, a positive electrode for lithium ion secondary batteries, a lithium ion secondary battery, and a method of producing a positive electrode material for lithium ion secondary batteries according to embodiments of the present invention will be described.

The embodiments will be described in detail to easily understand the concept of the present invention, but the present invention is not limited thereto.

[Positive Electrode Material for Lithium Ion Secondary Batteries]

The positive electrode material for lithium ion secondary batteries according to the embodiment includes inorganic particles whose surfaces are coated with a carbonaceous film, the inorganic particles being represented by a formula $LiFe_xMn_{1-x-y}M_yPO_4$ ($0.05 \leq x \leq 1.0$, $0 \leq y \leq 0.14$, where M represents at least one selected from the group consisting of Mg, Ca, Co, Sr, Ba, Ti, Zn, B, Al, Ga, In, Si, Ge, and rare earth elements), the positive electrode material has a specific surface area in a range from 6 $m^2/g$ to 20 $m^2/g$, a lightness $L^*$ in a range from 0 to 40, and a chroma $C^*$ in a range from 0 to 3.5.

The carbonaceous film imparts desired electron conductivity to inorganic particles (primary particles). The coverage of the carbonaceous film on the surfaces of the inorganic particles is preferably 80% or higher, more preferably 90% or higher, and still more preferably 95% or higher.

Here, when the coverage of the carbonaceous film is 80% or more, the coating of the surfaces of the inorganic particles with the carbonaceous film is sufficient. Therefore, it is possible to maintain preferable the electron conductivity of the inorganic particles coated with the carbonaceous film. Due to this, the resistance of the inorganic particles can be maintained low. As a result, in the lithium ion secondary battery in which the inorganic particles coated with the carbonaceous film are used, the discharge capacity at a high charge-discharge rate increases, and it is easy to realize sufficient charge and discharge rate performance.

In the positive electrode material for lithium ion secondary batteries according to the embodiment, the content of the carbonaceous film is preferably in a range from 0.5% by mass to 5.0% by mass, more preferably in a range from 0.7% by mass to 4.5% by mass, and still more preferably in a range from 0.8% by mass to 4.0% by mass with respect to the total mass of the inorganic particles.

Here, when the content of the carbonaceous film is 0.5% by mass or more, the amount of carbon is sufficient with respect to the total amount of the inorganic particles. It is possible to maintain sufficient electron conductivity of the inorganic particles coated with the carbonaceous film. As a result, in the lithium ion secondary battery in which the inorganic particles coated with the carbonaceous film are used, the discharge capacity at a high charge-discharge rate increases. It is easy to realize sufficient charge and discharge rate performance. On the other hand, when the content of the carbonaceous film is 5.0% by mass or less, the amount of carbon with respect to the total amount of the inorganic particles is also sufficient. Therefore, it is possible to obtain a suitable ratio of the inorganic particles to the carbonaceous film. It is easy to efficiently utilize characteristics as the positive electrode material for lithium ion secondary batteries.

The lightness L* and the chroma C* in the positive electrode material for lithium ion secondary batteries according to the embodiment refer to values calculated based on a calculation formula which is defined by ISO 11664-4:2008(E) (Colorimetry-Part 4: CIE 1976 L*a*b* Colour space). Specifically, the lightness L* and the chroma C* in the positive electrode material for lithium ion secondary batteries according to the embodiment refer to values calculated from the calculation formula using tristimulus values which are obtained by reflective light two-degree field spectroscopy using a spectral colorimeter (Model No. SE-2000, manufactured by Nippon Denshoku Industries Co., Ltd.) and a D65 light source. When the lightness L* and the chroma C* are measured in the positive electrode material for lithium ion secondary batteries, the positive electrode material as a measurement target is evenly placed on a dish to measure the lightness L* and the chroma C* of the positive electrode material.

As a result of thorough investigation, the present inventors found that a correlation is established between the lightness L* and the chroma C*; and powder characteristics of the positive electrode material for lithium ion secondary batteries including the inorganic particles whose surfaces are coated with the carbonaceous film, the inorganic particles being represented by $LiFe_xMn_{1-x-y}M_yPO_4$.

In addition, as a result of thorough investigation, the present inventors found that the amount of carbon coating the inorganic particles is appropriate, and the lithium ion secondary battery including the inorganic particles coated with the carbonaceous film exhibits good battery characteristics when the positive electrode material for lithium ion secondary batteries includes the inorganic particles whose surfaces are coated with the carbonaceous film, the inorganic particles are represented by $LiFe_xMn_{1-x-y}M_yPO_4$, the positive electrode material has the lightness L* in a range from 0 to 40 and the chroma C* in a range from 0 to 3.5; preferably the lightness L* in a range from 0 to 35 and the chroma C* in a range from 0 to 3.0; and more preferably the lightness L* in a range from 0 to 35 and the chroma C* in a range from 0 to 2.5.

In the positive electrode material for lithium ion secondary batteries according to the embodiment, the inorganic particles may be crystalline particles, amorphous particles, or mixed particles of crystalline particles and amorphous particles.

In the positive electrode material for lithium ion secondary batteries according to the embodiment, the inorganic particles can be produced using a well-known method such as a solid-phase method, a liquid-phase method or a gas-phase method.

The size of the positive electrode material for lithium ion secondary batteries according to the embodiment is not particularly limited, but the average primary particle size thereof is preferably in a range from 0.008 μm to 10 μm and more preferably in a range from 0.01 μm to 5 μm.

Here, the reason for limiting the average primary particle size of the primary particles of the positive electrode active material (inorganic particles) represented by $LiFe_xMn_{1-x-y}M_yPO_4$ is as follows. When the average primary particle size of the primary particles of the positive electrode active material represented by $LiFe_xMn_{1-x-y}M_yPO_4$ is 0.008 μm or more, it is easy to sufficiently coat the surfaces of the primary particles of the positive electrode active material with the carbonaceous film. Therefore, in the lithium ion secondary battery in which the positive electrode material for lithium ion secondary batteries according to the embodiment is used, the discharge capacity during high-speed charge and discharge is not decreased, and it is easy to realize sufficient charge-discharge performance. On the other hand, when the average primary particle size of the primary particles of the positive electrode active material represented by $LiFe_xMn_{1-x-y}M_yPO_4$ is 10 μm or less, the internal resistance of the primary particles of the positive electrode active material represented by $LiFe_xMn_{1-x-y}M_yPO_4$ decreases. Therefore, in the lithium ion secondary battery in which the positive electrode material for lithium ion secondary batteries according to the embodiment is used, the discharge capacity during high-speed charge and discharge is sufficient.

The positive electrode material for lithium ion secondary batteries according to the embodiment includes: inorganic particles (primary particles) represented by a formula $LiFe_xMn_{1-x-y}M_yPO_4$; and a carbonaceous film that coats surfaces of the inorganic particles. By coating the surfaces of the inorganic particles with the carbonaceous film, superior electron conductivity can be imparted to a positive electrode without a significant decrease in the density of the positive electrode in which the positive electrode material for lithium ion secondary batteries is used.

The amount of carbon forming the carbonaceous film is preferably in a range from 0.6 parts by mass to 10 parts by mass, and more preferably in a range from 0.8 parts by mass to 10 parts by mass, still more preferably in a range from 0.6 parts by mass to 2.5 parts by mass, and most preferably in a range from 0.8 parts by mass to 2.5 parts by mass with respect to 100 parts by mass of the inorganic particles. When the amount of carbon forming the carbonaceous film is 0.6 parts by mass or more, the coverage of the carbonaceous film on the surfaces of the inorganic particles is 80% or higher. As a result, in the lithium ion secondary battery in which the inorganic particles coated with the carbonaceous film are used, the discharge capacity at a high charge-discharge rate increases. Therefore, sufficient charge and discharge rate performance can be realized. On the other hand, when the amount of carbon forming the carbonaceous film is 10 parts by mass or less, the amount of the carbonaceous film is not excessively large with respect to the inorganic particle. Therefore, the positive electrode material for lithium ion secondary batteries does not contain carbon in an amount more than that for obtaining necessary conductivity, and a decrease in the capacity of the lithium ion secondary battery per unit volume can be suppressed.

In addition, in the positive electrode material for lithium ion secondary batteries including the inorganic particles whose surfaces are coated with the carbonaceous film, it is preferable that the primary particles are agglomerated to form secondary particles.

By the primary particles of the positive electrode material for lithium ion secondary batteries forming secondary particles, pores are formed so as to allow the diffusion penetration of lithium ions between the primary particles of the positive electrode material for lithium ion secondary batteries. Therefore, the lithium ions can reach the surface of the positive electrode material for lithium ion secondary batteries, and the lithium ions can be efficiently intercalated and deintercalated. In addition, the primary particles of the positive electrode material for lithium ion secondary batteries are bonded to each other through the carbonaceous film, and electron conduction between the primary particles is easily established.

In addition, the carbonaceous film may contain carbon particles of acetylene black, carbon black, graphite, Ketjen black, or the like.

In the positive electrode material for lithium ion secondary batteries according to the embodiment, the specific surface area is adjusted to a range from 6 m$^2$/g to 20 m$^2$/g, the lightness L* is adjusted to a range from 0 to 40, and the chroma C* is adjusted to a range from 0 to 3.5. As a result, a good lithium ion secondary battery can be manufactured without actually measuring battery characteristics of a lithium ion secondary battery after the construction of the lithium ion secondary battery.

[Method of Producing Positive Electrode Material for Lithium Ion Secondary Batteries]

The method of producing a positive electrode material for lithium ion secondary batteries according to the embodiment is a method of producing a positive electrode material for lithium ion secondary batteries in which the positive electrode material including inorganic particles whose surfaces are coated with a carbonaceous film, the inorganic particles being represented by a formula LiFe$_x$Mn$_{1-x-y}$M$_y$PO$_4$ (0.05≤x≤1.0, 0≤y≤0.14, where M represents at least one selected from the group consisting of Mg, Ca, Co, Sr, Ba, Ti, Zn, B, Al, Ga, In, Si, Ge, and rare earth elements). This method includes a first step of heating a liquid materialmaterial in an airtight container, the liquid material containing a Li compound, an Fe compound, a Mn compound, an M compound (where M represents at least one selected from the group consisting of Mg, Ca, Co, Sr, Ba, Ti, Zn, B, Al, Ga, In, Si, Ge, and rare earth elements) and at least one of a P compound and a S compound.

In the embodiment, "liquid materialmaterial" includes both a solution and a dispersion (slurry) containing the above-described compounds.

In the method of producing a positive electrode material for lithium ion secondary batteries according to the embodiment, a hydrothermal synthesis method is adopted.

The liquid material contains (1) a Li compound, (2) an Fe compound, (3) a Mn compound, (4) an M compound (where M represents at least one selected from the group consisting of Mg, Ca, Co, Sr, Ba, Ti, Zn, B, Al, Ga, In, Si, Ge, and rare earth elements) and (5) at least one of a P compound and a S compound.

Examples of (1) the Li compound include lithium salts such as lithium acetate (LiCH$_3$COO), lithium chloride (LiCl), and lithium hydroxide (LiOH). Among these compounds, one kind may be used alone, or two or more kinds may be used in combination.

Examples of (2) the Fe compound include iron salts such as iron (II) chloride (FeCl$_2$), iron (II) acetate (Fe(CH$_3$COO)$_2$), and iron (II) sulfate (FeSO$_4$). Among these compounds, one kind may be used alone, or two or more kinds may be used in combination.

Examples of (3) the Mn compound include manganese salts such as manganese (II) chloride (MnCl$_2$), manganese (II) acetate (Mn(CH$_3$COO)$_2$), and manganese (II) sulfate (MnSO$_4$). Among these compounds, one kind may be used alone, or two or more kinds may be used in combination.

As (4) the M compound, a compound containing at least one selected from the group consisting of Mg, Ca, Co, Sr, Ba, Ti, Zn, B, Al, Ga, In, Si, Ge, and rare earth elements is used.

Examples of a Mg source include magnesium (II) chloride (MgCl$_2$), magnesium (II) sulfate (MgSO$_4$), magnesium (II) nitrate (Mg(NO$_3$)$_2$), magnesium (II) acetate (Mg(CH$_3$COO)$_2$), and hydrates thereof. As the Mg source, at least one selected from the group consisting of the above compounds is preferably used.

Examples of a Ca source include calcium (II) chloride (CaCl$_2$), calcium (II) sulfate (CaSO$_4$), calcium (II) nitrate (Ca(NO$_3$)$_2$), calcium (II) acetate (Ca(CH$_3$COO)$_2$), and hydrates thereof. As the Ca source, at least one selected from the group consisting of the above compounds is preferably used.

As a Co source, a Co salt is preferable, and examples thereof include cobalt (II) chloride (CoCl$_2$), cobalt (II) sulfate (CoSO$_4$), cobalt (II) nitrate (Co(NO$_3$)$_2$), cobalt (II) acetate (Co(CH$_3$COO)$_2$), and hydrates thereof. As the Co source, at least one selected from the group consisting of the above compounds is preferably used.

Examples of a Sr source include strontium carbonate (SrCO$_3$), strontium sulfate (SrSO$_4$), and strontium hydroxide (Sr(OH)$_2$). As the Sr source, at least one selected from the group consisting of the above compounds is preferably used.

Examples of a Ba source include barium (II) chloride (BaCl$_2$), barium (II) sulfate (BaSO$_4$), barium (II) nitrate (Ba(NO$_3$)$_2$), barium (II) acetate (Ba(CH$_3$COO)$_2$), and hydrates thereof. As the Ba source, at least one selected from the group consisting of the above compounds is preferably used.

Examples of a Ti source include titanium chlorides (TiCl$_4$, TiCl$_3$, and TiCl$_2$), titanium oxide (TiO), and hydrates thereof. As the Ti source, at least one selected from the group consisting of the above compounds is preferably used.

As a Zn source, a Zn salt is preferable, and examples thereof include zinc (II) chloride (ZnCl$_2$), zinc (II) sulfate (ZnSO$_4$), zinc (II) nitrate (Zn(NO$_3$)$_2$), zinc (II) acetate (Zn(CH$_3$COO)$_2$), and hydrates thereof. As the Zn source, at least one selected from the group consisting of the above compounds is preferably used.

Examples of a B source include boron compounds of chlorides, sulfates, nitrates, acetates, hydroxides, oxides, and the like. As the B source, at least one selected from the group consisting of the above compounds is preferably used.

Examples of an Al source include aluminum compounds of chlorides, sulfates, nitrates, acetates, hydroxides, and the like. As the Al source, at least one selected from the group consisting of the above compounds is preferably used.

Examples of a Ga source include gallium compounds of chlorides, sulfates, nitrates, acetates, hydroxides, and the like. As the Ga source, at least one selected from the group consisting of the above compounds is preferably used.

Examples of an In source include indium compounds of chlorides, sulfates, nitrates, acetates, hydroxides, and the like. As the In source, at least one selected from the group consisting of the above compounds is preferably used.

Examples of a Si source include sodium silicate, potassium silicate, silicon tetrachloride (SiCl$_4$), silicates, and organic silicon compounds. As the Si source, at least one selected from the group consisting of the above compounds is preferably used.

Examples of a Ge source include germanium compounds of chlorides, sulfates, nitrates, acetates, hydroxides, oxides, and the like. As the Ge source, at least one selected from the group consisting of the above compounds is preferably used.

Examples of a rare earth element source include chlorides, sulfates, nitrates, acetates, hydroxides, and oxides of Sc, Y, La, Ce, Pr, Nd, Pm, Sm, Eu, Gd, Tb, Dy, Ho, Er, Tm, Yb, and Lu. As the rare earth element source, at least one selected from the group consisting of the above compounds is preferably used.

Examples of (5) the P compound include phosphoric acid ($H_3PO_4$), ammonium dihydrogen phosphate ($NH_4H_2PO_4$), and diammonium hydrogen phosphate (($NH_4)_2HPO_4$). Among these compounds, one kind may be used alone, or two or more kinds may be used in combination.

Examples of (5) the S compound include sulfuric acid ($H_2SO_4$), ammonium sulfate (($NH_4)_2SO_4$), and lithium sulfate ($Li_2SO_4$). Among these compounds, one kind may be used alone, or two or more kinds may be used in combination.

The liquid material is prepared by mixing the above compounds with water. As a method of mixing the compounds with water, a well-known method is used.

In addition, when the compounds are mixed with water, the respective plural solid compounds may be mixed with water. Alternatively, aqueous solutions or dispersions of the respective compounds may be prepared first, and then the aqueous solutions or dispersions may be mixed with each other.

Next, the obtained liquid material is heated in a pressure-resistant airtight container to perform a hydrothermal reaction under high-temperature and high-pressure conditions, for example, 120° C. to 250° C. and 0.1 MPa or higher for 1 hour to 24 hours (first step). As a result, inorganic particles are obtained as a reaction product, the inorganic particles being represented by a formula $LiFe_xMn_{1-x-y}M_yPO_4$ ($0.05 \leq x \leq 1.0$, $0 \leq y \leq 0.14$, where M represents at least one selected from the group consisting of Mg, Ca, Co, Sr, Ba, Ti, Zn, B, Al, Ga, In, Si, Ge, and rare earth elements).

In addition, it is preferable that the method of producing a positive electrode material for lithium ion secondary batteries according to the embodiment further include a second step of drying a slurry containing a reaction product, which is obtained in the first step, and an organic compound to obtain a solid material, and performing a heat treatment on the solid material in a non-oxidative atmospheresolid material. It is preferable that the organic compound be used in combination with a surfactant because the carbonaceous film having a high coverage can be formed on the surfaces of the positive electrode material particles using a small amount of carbon.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, and polyols. Examples of the polyols include polyethylene glycol, polypropylene glycol, polyglycerin, and glycerin.

Examples of the surfactant include anionic surfactants such as fatty acid salts, monoalkyl sulfuric acid salts, alkyl benzene sulfonic acid salts, and monoalkyl phosphoric acid salts; cationic surfactants such as alkyl trimethyl ammonium salts and dialkyl dimethyl ammonium salts; amphoteric surfactants such as alkyl dimethylamine oxide and alkylcarboxybetaine; and nonionic surfactants such as polyoxyethylene alkyl ethers, fatty acid sorbitan esters, alkyl polyglucosides, fatty acid diethanolamides, and alkyl monoglyceryl ethers.

The above-described reaction product and the organic compound are dissolved or dispersed in a solvent to prepare a uniform slurry. As the solvent, water is preferably used.

Further, the above-described slurry may contain a carbonization catalyst to promote the carbonization of the organic compound in a heat treatment described below.

As the carbonization catalyst, a phosphorus compound or a sulfur compound is used.

Examples of the phosphorus compound as the carbonization catalyst include yellow phosphorus, red phosphorus, phosphoric acids such as orthophosphoric acid ($H_3PO_4$) or metaphosphoric acid ($HPO_3$), ammonium dihydrogen phosphate ($NH_4H_2PO_4$), diammonium hydrogen phosphate (($NH_4)_2HPO_4$), ammonium phosphate (($NH_4)_3PO_4$), lithium phosphate ($Li_3PO_4$), dilithium hydrogen phosphate ($Li_2HPO_4$), lithium dihydrogen phosphate ($LiH_2PO_4$), and hydrates thereof. Among these compounds, one kind may be used alone, or two or more kinds may be used in combination.

Examples of the sulfur compound as the carbonization catalyst include sulfuric acid ($H_2SO_4$), ammonium sulfate (($NH_4)_2SO_4$), and lithium sulfate ($Li_2SO_4$). Among these compounds, one kind may be used alone, or two or more kinds may be used in combination.

It is preferable that an aqueous solution first in which the carbonization catalyst is dissolved is mixed with the slurry because the respective compounds are uniformly mixed with each other in the slurry.

During the production of the positive electrode material for lithium ion secondary batteries including the inorganic particles whose surfaces are coated with the carbonaceous film, first, the slurry prepared as above is dried.

As a method of drying the slurry, a spray pyrolysis method is preferably used. Examples of a method of drying the slurry using the spray pyrolysis method include a method in which the slurry is sprayed and dried in a high-temperature atmosphere, for example, in air at 70° C. to 250° C. to produce a granulated body.

Next, a heat treatment is performed on the obtained solid granulated body in a non-oxidative atmosphere (second step).

Here, "non-oxidative atmosphere" refers to an inert atmosphere or a reducing atmosphere.

A temperature condition of the heat treatment is preferably 700° C. or higher and more preferably 800° C. or higher. In addition, the temperature condition is preferably 1,000° C. or lower and more preferably 900° C. or lower. In other words, the temperature in the heat treatment is preferably in a range from 700° C. to 1,000° C., more preferably 700° C. to 1,000° C., or 700° C. to 900° C., and most preferably 800° C. to 900° C.

The heat treatment time is not particularly limited as long as the organic compound is sufficiently carbonized. For example, the heat treatment time is 0.1 hours to 10 hours.

Due to the above-described method of producing a positive electrode material for lithium ion secondary batteries, the positive electrode material for lithium ion secondary batteries including the inorganic particles whose surfaces are coated with the carbonaceous film can be suitably produced.

The lightness L* and the chroma C* of the positive electrode material for lithium ion secondary batteries produced by the production method according to the embodiment are measured to determine whether or not the coating degree (for example, coverage) of the carbonaceous film on the surfaces of the inorganic particles is appropriate. The lightness L* is in a range of 0 to 100, and it can be said that, as the absolute value thereof decreases, the color of the positive electrode material approaches achromatic color. In addition, the chroma C* can be calculated using chromaticity a* and b* from $((a^*)^2+(b^*)^2)^{1/2}$, and is in a range of 0 to 100. As the lightness L* and the chroma C* approach 0, the color of the positive electrode material approaches achromatic color. Therefore, a correlation is established between the lightness L* and the chroma C* and an increase in the amount of carbon.

With the method of producing a positive electrode material for lithium ion secondary batteries according to the embodiment, a positive electrode material for lithium ion secondary batteries can be easily produced which is capable of manufacturing a good lithium ion secondary battery.

[Positive Electrode for Lithium Ion Secondary Batteries]

The positive electrode for lithium ion secondary batteries according to the embodiment includes: a current collector; and an electrode mixture layer (electrode) that is formed on the current collector, in which the electrode mixture layer contains the positive electrode material for lithium ion secondary batteries according to the embodiment.

That is, in the electrode for lithium ion secondary batteries according to the embodiment, the electrode mixture layer is formed on one main surface of the current collector using the positive electrode material for lithium ion secondary batteries according to the embodiment.

The electrode for lithium ion secondary batteries according to the embodiment is mainly used as the positive electrode for lithium ion secondary batteries.

A method of manufacturing the electrode for lithium ion secondary batteries according to the embodiment is not particularly limited as long as an electrode can be formed on one main surface of the current collector using the positive electrode material for lithium ion secondary batteries according to the embodiment. Examples of the method of manufacturing the electrode for lithium ion secondary batteries include the following method.

First, the positive electrode material for lithium ion secondary batteries according to the embodiment, a binder, and a solvent are mixed with each other to prepare a positive electrode material paste for lithium ion secondary batteries.

In addition, optionally, a conductive auxiliary agent may be added to the positive electrode material for lithium ion secondary batteries according to the embodiment.

[Binder]

As the binder, that is, as a binder resin, for example, a polytetrafluoroethylene (PTFE) resin, a polyvinylidene fluoride (PVdF) resin, or a fluororubber is preferably used.

A mixing ratio of the binder to the positive electrode material for lithium ion secondary batteries according to the embodiment is not particularly limited. For example, the mixing ratio of the binder is preferably in a range from 1 part by mass to 30 parts by mass and more preferably in a range from 3 parts by mass to 20 parts by mass with respect to 100 parts by mass of the positive electrode material for lithium ion secondary batteries.

Here, the reason for limiting the mixing ratio of the binder to the positive electrode material for lithium ion secondary batteries to be in the above-described range is as follows. It is preferable that the mixing ratio of the binder is 1 part by mass or more, because when the electrode mixture layer is formed using the positive electrode material paste for lithium ion secondary batteries including the positive electrode material for lithium ion secondary batteries according to the embodiment, the binding between the electrode mixture layer and the current collector is sufficient. The cracking or peeling of the electrode mixture layer does not occur during the roll forming of the electrode mixture layer. In addition, it is preferable that, during the charge and discharge of the battery, the electrode mixture layer is hardly peeled off from the current collector. Thus the battery capacity or the high charge-discharge rate increase. On the other hand, it is preferable that the mixing ratio of the binder is 30 parts by mass or less because the internal resistance of the positive electrode material for lithium ion secondary batteries decrease, and thus the battery capacity at a high charge-discharge rate increase.

[Conductive Auxiliary Agent]

The conductive auxiliary agent is not particularly limited, and for example, at least one selected from the group acetylene black, Ketjen black, Furnace black, and filamentous carbon such as vapor-grown carbon fiber (VGCF) or carbon nanotube is used.

[Solvent]

The solvent is appropriately added to the positive electrode material paste for lithium ion secondary batteries including the positive electrode material for lithium ion secondary batteries according to the embodiment so as to easily coat a coating object such as the current collector with the paste.

Examples of the solvent include water; alcohols such as methanol, ethanol, 1-propanol, 2-propanol (isopropyl alcohol: IPA), butanol, pentanol, hexanol, octanol, and diaceton alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetyl acetone, and cyclohexanone; amides such as dimethylformamide, N,N-dimethylacetamide, and N-methylpyrrolidone; and glycols such as ethylene glycol, diethylene glycol, and propylene glycol. Among these solvents, one kind may be used alone, or a mixture of two or more kinds may be used.

When the total mass of the positive electrode material for lithium ion secondary batteries according to the embodiment, the binder, and the solvent is represented by 100% by mass, the content ratio of the solvent in the positive electrode material paste for lithium ion secondary batteries is preferably in a range from 50% by mass to 70% by mass and more preferably in a range from 55% by mass to 65% by mass.

By controlling the content ratio of the solvent in the above-described range, the positive electrode material paste for lithium ion secondary batteries having good electrode formability and good battery characteristics can be obtained.

A method of mixing the positive electrode material for lithium ion secondary batteries according to the embodiment, the binder, the conductive auxiliary agent, and the solvent with each other is not particularly limited as long as the above components can be uniformly mixed with each other, and examples thereof include a method using a kneader such as a ball mill, a sand mill, a planetary mixer, a paint shaker, or a homogenizer.

Next, one main surface of the current collector is coated with the positive electrode material paste for lithium ion secondary batteries to form a film thereon, and this film is dried and compressed. As a result, the positive electrode for lithium ion secondary batteries in which the electrode mixture layer is formed on the main surface of the current collector can be obtained.

In the positive electrode for lithium ion secondary batteries according to the embodiment, the positive electrode material for lithium ion secondary batteries according to the embodiment is used. As a result, a bad product is not likely to be manufactured, and a highly reliable electrode can be obtained.

[Lithium Ion Secondary Battery]

The lithium ion secondary battery according to the embodiment includes: the positive electrode for lithium ion secondary batteries according to the embodiment as a positive electrode; a negative electrode; a separator; and an electrolytic solution.

In the lithium ion secondary battery according to the embodiment, the negative electrode, the electrolytic solution, the separator, and the like are not particularly limited.

[Negative Electrode]

The negative electrode is formed of, for example, a negative electrode material such as metal Li, a carbon material, a Li alloy, or $Li_4Ti_5O_{12}$.

[Electrolytic Solution]

The electrolytic solution can be prepared by mixing ethylene carbonate (EC) and ethyl methyl carbonate (EMC) with each other at a volume ratio of 1:1 to obtain a mixed solvent, and dissolving lithium hexafluorophosphate ($LiPF_6$) in the obtained mixed solvent such that the concentration thereof is, for example, 1 mol/dm$^3$.

[Separator]

As the separator, for example, porous propylene can be used.

In addition, a solid electrolyte may be used instead of the electrolytic solution and the separator.

In the lithium ion secondary battery according to the embodiment, the positive electrode for lithium ion secondary batteries according to the embodiment is used. As a result, a bad product is not likely to be manufactured, and a highly reliable battery can be obtained.

In the positive electrode material for lithium ion secondary batteries according to the embodiment, whether or not the positive electrode material exhibits good battery characteristics can be evaluated by measuring the specific surface area, the lightness L*, and the chroma C*. Therefore, the number of batteries wasted in a test after the construction can be reduced.

With the method of producing a positive electrode material for lithium ion secondary batteries according to the embodiment, a positive electrode material for lithium ion secondary batteries can be easily produced which is capable of manufacturing a good lithium ion secondary battery.

The positive electrode for lithium ion secondary batteries according to the embodiment includes the positive electrode material for lithium ion secondary batteries according to the embodiment. Therefore, a highly reliable lithium ion secondary battery can be manufactured.

The lithium ion secondary battery according to the embodiment includes the positive electrode for lithium ion secondary batteries according to the embodiment. Therefore, the battery has good battery characteristics and high reliability.

Hereinabove, the preferred embodiments of the present invention have been described. However, it is needless to say that the present invention is not limited to the embodiments. The shapes, combinations, and the like of the respective components shown in the above-described embodiments are merely exemplary, and various modifications can be made based on the design requirement within a range not departing from the scope of the present invention.

EXAMPLES

Hereinafter, the present invention will be described in detail using Examples and Comparative Examples, but is not limited to the following examples.

In Examples, acetylene black was used as the conductive auxiliary agent. However, instead of acetylene black, for example, a carbon material such as carbon black, graphite, Ketjen black, natural graphite, or artificial graphite may be used. In addition, in Examples, battery characteristics were evaluated in a battery in which Li metal was used for a counter electrode (negative electrode). However, instead of Li metal, a negative electrode material, for example, a carbon material such as natural graphite, artificial graphite, or coke; $Li_4Ti_5O_{12}$; or a Li alloy may be used. In addition, in Examples, as a non-aqueous electrolytic solution, a mixed solution of ethylene carbonate and diethyl carbonate (volume ratio=1:1) containing 1 mol/L of $LiPF_6$ was used. However, instead of $LiPF_6$, $LiBF_4$ or $LiClO_4$ may be used. Instead of ethylene carbonate, propylene carbonate or diethyl carbonate may be used. In addition, a solid electrolyte may be used instead of the electrolytic solution and the separator.

$LiFe_xMn_{1-x-y}M_yPO_4$ powder ($0.05 \leq x \leq 1.0$, $0 \leq y \leq 0.14$, where M represents at least one selected from the group consisting of Mg, Ca, Co, Sr, Ba, Ti, Zn, B, Al, Ga, In, Si, Ge, and rare earth elements; hereinafter, referred to simply as "powder") was evaluated.

[Evaluation]

(1) Measurement of Lightness L* and Chroma C*

The lightness L* and the chroma C* of the powder were calculated from a calculation formula defined by ISO 11664-4:2008(E) using tristimulus values which are obtained by reflective light two-degree field spectroscopy using a spectral colorimeter (Model No. SE-2000, manufactured by Nippon Denshoku Industries Co., Ltd.). During the measurement of the tristimulus values, the powder as a measurement target was evenly placed on a dish to measure the lightness L* and the chroma C* of the powder.

(2) Specific Surface Area

Using a specific surface area meter (trade name: BEL-SORP-mini, manufactured by MicrotracBEL Corp.), the specific surface area of the powder was measured according to a BET method using nitrogen ($N_2$) adsorption.

(3) Measurement of Amount of Carbon

Using a carbon analyzer (trade name: EMIA-220V, manufactured by Horiba Ltd.), the amount of carbon in the positive electrode material for lithium ion secondary batteries was measured.

(4) Measurement of Charge and Discharge Characteristics (4-1) Preparation of Lithium Ion Secondary Battery A positive electrode material obtained in each of Examples and Comparative Examples described below; acetylene black (AB) as a conductive auxiliary agent; and polyvinylidene fluoride (PVdF) as a binder were mixed with each other at a mass ratio (positive electrode material:AB:PVdF) of 90:5:5 in N-methyl-2-pyrrolidinone (NMP) to prepare a positive electrode material paste.

An aluminum foil having a thickness of 30 μm was coated with the obtained positive electrode material paste, and a film having a thickness of 300 μm which was formed of positive electrode material paste was formed on the aluminum foil.

The film was dried and compressed against the aluminum foil at a pressure of 40 MPa so as to obtain a thickness of about 100 μm. As a result, an electrode plate was obtained.

The obtained electrode plate was punched into a disk shape having a diameter of 16 mm. As a result, a test electrode was prepared.

As a counter electrode, commercially available Li metal was used.

As a separator, a porous polypropylene membrane (Model No.: #2500, manufactured by Celgard Inc.) was used.

As a non-aqueous electrolytic solution, 1 mol/L of LiPF$_6$ solution was used. As a solvent used in this LiPF$_6$ solution, a mixed solvent of ethylene carbonate and diethyl carbonate (volume ratio=1:1) was used.

Using the test electrode, the counter electrode, the separator, the non-aqueous electrolytic solution, and a 2032 type coin cell, a lithium ion secondary battery of each of Examples and Comparative Examples was prepared.

(4-2) Measurement of 0.1 C and 3 C Discharge Capacities

The discharge capacity of the prepared coin type lithium ion secondary battery was measured using a discharge capacity measuring device (trade name: HJ1010mSM8, manufactured by Hokuto Denko Corp.).

The prepared coin type lithium ion secondary battery was charged at a constant current of 0.1 C at 25° C. until the charge voltage reached 4.2 V. Next, the battery was charged at a constant voltage, and the charging was stopped when the current value reached 0.01 C.

Next, the battery was discharged at a discharge current density of 0.1 C or 3 C, and the discharging was stopped when the battery voltage reached 2.0 V. When the discharging was stopped, the discharge capacity was measured and set as a 3 C discharge capacity.

(4-3) Measurement of Ratio 3 C Capacity/0.1 C Capacity

The prepared coin type lithium ion secondary battery was charged under the above-described conditions and then was discharged at a discharge current of 0.1 C. The discharging was stopped when the battery voltage reached 2.0 V. When the discharging was stopped, the discharge capacity was measured and set as a 0.1 C discharge capacity, and this 0.1 C discharge capacity was set as an initial capacity.

Next, a ratio 3 C capacity/0.1 C capacity was calculated using the obtained initial capacity (0.1 C discharge capacity) and the 3 C discharge capacity obtained using the above-described method.

(4-5) Measurement of Direct Current Resistance (DCR)

The battery was charged at a current of 0.1 C for 5 hours, and the charge depth thereof was adjusted (SOC 50%). Using this battery, the DCR was measured. To the battery whose SOC was adjusted to 50%, currents corresponding to 1 C, 3 C, 5 C, and 10 C were applied for 10 seconds alternately in a charging direction and a discharging direction. Next, after 10 seconds, the voltage was monitored for the evaluation. Whenever the application direction or the applied value of the current was changed, an interval time of 10 minutes was provided. The DCR was obtained from the slope of a line which was plotted on a graph in which the horizontal axis represents each current value and the vertical axis represents the voltage after 10 seconds.

Example 1

Lithium phosphate (Li$_3$PO$_4$), 2 mol of iron (II) sulfate (FeSO$_4$), and phosphoric acid (H$_3$PO$_4$) were added to 2 L (liter) of water and were mixed with each other such that Li/Fe=3.01 and H$_3$PO$_4$/Fe=0.04 by molar ratio and the total volume was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 5.5 g of polyethylene glycol as an organic compound, 0.1 g of cocamidopropyl betaine, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of LiFePO$_4$ and coated with an organic material was obtained.

The obtained granulated body was fired in a non-oxidative gas atmosphere at 700° C. for 1 hour and was held at 40° C. for 30 minutes. As a result, a positive electrode material (A1) was obtained.

When this positive electrode material (A1) was observed with a scanning electron microscope (SEM) and a transmission electron microscope (TEM), plural primary particles were agglomerated to form secondary particles, the surfaces of the primary particles were coated with carbon, and carbon was interposed between the primary particles.

When the lightness L* and the chroma C* of the positive electrode material (A1) were measured according to the above-described method, the lightness L* was 31.2, and the chroma C* was 1.86.

When the specific surface area of the positive electrode material (A1) was measured using the above-described method, the specific surface area was 6.4 m$^2$/g.

When the amount of carbon of the positive electrode material (A1) was measured using the above-described method, the amount of carbon was 0.9% by mass.

When the charge and discharge characteristics of the positive electrode material (A1) were measured using the above-described method, the 3 C discharge capacity was 136.3 mAh/g, and the ratio 3 C capacity/0.1 C capacity was 86.3%.

When the DCR of the positive electrode material (A1) was measured using the above-described method, the charge DCR was 258 Ω·mg, and the discharge DCR was 99 Ω·mg.

The above results are shown in Table 1.

Example 2

The cake-like electrode active material precursor was obtained by the same procedure as that of Example 1.

Next, 5.5 g of polyethylene glycol as an organic compound, 0.1 g of cocamidopropyl betaine, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of LiFePO$_4$ was and coated with an organic material was obtained.

The obtained granulated body was fired in a non-oxidative gas atmosphere at 750° C. for 1 hour and was held at 40° C. for 30 minutes. As a result, a positive electrode material (A2) was obtained.

When the lightness L* and the chroma C* of the positive electrode material (A2) were measured according to the above-described method, the lightness L* was 29.2, and the chroma C* was 1.29.

When the specific surface area of the positive electrode material (A2) was measured using the above-described method, the specific surface area was 8.1 m$^2$/g.

When the amount of carbon of the positive electrode material (A2) was measured using the above-described method, the amount of carbon was 1.0% by mass.

When the charge and discharge characteristics of the positive electrode material (A2) were measured using the above-described method, the 3 C discharge capacity was 133.0 mAh/g, and the ratio 3 C capacity/0.1 C capacity was 86.9%.

When the DCR of the positive electrode material (A2) was measured using the above-described method, the charge DCR was 156 Ω·mg, and the discharge DCR was 79 Ω·mg.

The above results are shown in Table 1.

Example 3

The cake-like electrode active material precursor was obtained by the same procedure as that of Example 1.

Next, 5.5 g of polyethylene glycol as an organic compound, 0.1 g of cocamidopropyl betaine, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFePO_4$ and coated with an organic material was obtained.

The obtained granulated body was fired in a non-oxidative gas atmosphere at 800° C. for 1 hour and was held at 40° C. for 30 minutes. As a result, a positive electrode material (A3) was obtained.

When the lightness L* and the chroma C* of the positive electrode material (A3) were measured according to the above-described method, the lightness L* was 25.5, and the chroma C* was 0.66.

When the specific surface area of the positive electrode material (A3) was measured using the above-described method, the specific surface area was 10.7 m²/g. When the amount of carbon of the positive electrode material (A3) was measured using the above-described method, the amount of carbon was 1.1% by mass.

When the charge and discharge characteristics of the positive electrode material (A3) were measured using the above-described method, the 3 C discharge capacity was 134.2 mAh/g, and the ratio 3 C capacity/0.1 C capacity was 87.1%.

When the DCR of the positive electrode material (A3) was measured using the above-described method, the charge DCR was 109 Ω·mg, and the discharge DCR was 74 Ω·mg.

The above results are shown in Table 1.

Example 4

Lithium phosphate ($Li_3PO_4$), lithium hydroxide (LiOH), iron (II) sulfate ($FeSO_4$) manganese (II) sulfate ($MnSO_4$), and phosphoric acid ($H_3PO_4$) were added to 2 L (liter) of water and were mixed with each other such that Li/(Fe+Mn)=3.01, $Li_3PO_4$/(Fe+Mn)=0.95, $FeSO_4$+$MnSO_4$=2 mol, and Fe:Mn=1:4 by molar ratio and the total amount was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 5.5 g of polyethylene glycol as an organic compound, 0.1 g of cocamidopropyl betaine, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFe_{0.25}Mn_{0.75}PO_4$ and coated with an organic material was obtained.

The obtained granulated body was fired in a non-oxidative gas atmosphere at 700° C. for 1 hour and was held at 40° C. for 30 minutes. As a result, a positive electrode material (A4) was obtained.

When the lightness L* and the chroma C* of the positive electrode material (A4) were measured according to the above-described method, the lightness L* was 32.0, and the chroma C* was 1.04.

When the specific surface area of the positive electrode material (A4) was measured using the above-described method, the specific surface area was 11.4 m²/g.

When the amount of carbon of the positive electrode material (A4) was measured using the above-described method, the amount of carbon was 0.8% by mass.

When the charge and discharge characteristics of the positive electrode material (A4) were measured using the above-described method, the 3 C discharge capacity was 124.8 mAh/g, and the ratio 3 C capacity/0.1 C capacity was 82.1%.

When the DCR of the positive electrode material (A4) was measured using the above-described method, the charge DCR was 260 Ω·mg, and the discharge DCR was 102 Ω·mg.

The above results are shown in Table 1.

Example 5

Lithium phosphate ($Li_3PO_4$), lithium hydroxide (LiOH), iron (II) sulfate ($FeSO_4$), manganese (II) sulfate ($MnSO_4$), and phosphoric acid ($H_3PO_4$) were added to 2 L (liter) of water and were mixed with each other such that Li/(Fe+Mn)=3.01, $Li_3PO_4$/(Fe+Mn)=0.95, $FeSO_4$+$MnSO_4$=2 mol, and Fe:Mn=1:4 by molar ratio and the total amount was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 5.5 g of polyethylene glycol as an organic compound, 0.1 g of cocamidopropyl betaine, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFe_{0.25}Mn_{0.75}PO_4$ and coated with an organic material was obtained.

The obtained granulated body was fired in a non-oxidative gas atmosphere at 750° C. for 1 hour and was held at 40° C. for 30 minutes. As a result, a positive electrode material (A5) was obtained.

When the lightness L* and the chroma C* of the positive electrode material (A5) were measured according to the above-described method, the lightness L* was 12.9, and the chroma C* was 0.50.

When the specific surface area of the positive electrode material (A5) was measured using the above-described method, the specific surface area was 11.8 $m^2/g$.

When the amount of carbon of the positive electrode material (A5) was measured using the above-described method, the amount of carbon was 1.6% by mass.

When the charge and discharge characteristics of the positive electrode material (A5) were measured using the above-described method, the 3 C discharge capacity was 113.4 mAh/g, and the ratio 3 C capacity/0.1 C capacity was 77.3%.

When the DCR of the positive electrode material (A5) was measured using the above-described method, the charge DCR was 100 Ω·mg, and the discharge DCR was 83 Ω·mg.

The above results are shown in Table 1.

Example 6

Lithium phosphate ($Li_3PO_4$), lithium hydroxide (LiOH), iron (II) sulfate ($FeSO_4$), manganese (II) sulfate ($MnSO_4$), cobalt sulfate ($CoSO_4$), and phosphoric acid ($H_3PO_4$) were added to 2 L (liter) of water and were mixed with each other such that Li/(Fe+Mn+Co)=3.01, $Li_3PO_4$/(Fe+Mn+Co)= 0.95, Fe:Mn:Co=4:15:1, $FeSO_4+MnSO_4+CoSO_4$=2 mol and the total amount was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 5.5 g of polyethylene glycol as an organic compound, 0.1 g of cocamidopropyl betaine, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFe_{0.25}Mn_{0.75}PO_4$ and coated with an organic material was obtained.

The obtained granulated body was fired in a non-oxidative gas atmosphere at 750° C. for 1 hour and was held at 40° C. for 30 minutes. As a result, a positive electrode material (A6) was obtained.

When the lightness L* and the chroma C* of the positive electrode material (A6) were measured according to the above-described method, the lightness L* was 37.3, and the chroma C* was 3.32.

When the specific surface area of the positive electrode material (A6) was measured using the above-described method, the specific surface area was 11.1 $m^2/g$.

When the amount of carbon of the positive electrode material (A6) was measured using the above-described method, the amount of carbon was 0.8% by mass.

When the charge and discharge characteristics of the positive electrode material (A6) were measured using the above-described method, the 3 C discharge capacity was 121.9 mAh/g, and the ratio 3 C capacity/0.1 C capacity was 81.6%.

When the DCR of the positive electrode material (A6) was measured using the above-described method, the charge DCR was 262 Ω·mg, and the discharge DCR was 105 Ω·mg.

The above results are shown in Table 1.

Example 7

Lithium phosphate ($Li_3PO_4$), lithium hydroxide (LiOH), iron (II) sulfate ($FeSO_4$), manganese (II) sulfate ($MnSO_4$), cobalt sulfate ($CoSO_4$), and phosphoric acid ($H_3PO_4$) were added to 2 L (liter) of water and were mixed with each other such that Li/(Fe+Mn+Co)=3.01, $Li_3PO_4$/(Fe+Mn+Co)= 0.95, Fe:Mn:Co=4:15:1, $FeSO_4+MnSO_4+CoSO_4$=2 mol and the total amount was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 5.5 g of polyethylene glycol as an organic compound, 0.1 g of cocamidopropyl betaine, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFe_{0.25}Mn_{0.75}PO_4$ and coated with an organic material was obtained.

The obtained granulated body was fired in a non-oxidative gas atmosphere at 800° C. for 1 hour and was held at 40° C. for 30 minutes. As a result, a positive electrode material (A7) was obtained.

When the lightness L* and the chroma C* of the positive electrode material (A7) were measured according to the above-described method, the lightness L* was 27.3, and the chroma C* was 0.38.

When the specific surface area of the positive electrode material (A7) was measured using the above-described method, the specific surface area was 11.8 $m^2/g$.

When the amount of carbon of the positive electrode material (A7) was measured using the above-described method, the amount of carbon was 1.1% by mass.

When the charge and discharge characteristics of the positive electrode material (A7) were measured using the above-described method, the 3 C discharge capacity was 116.5 mAh/g, and the ratio 3 C capacity/0.1 C capacity was 77.3%.

When the DCR of the positive electrode material (A7) was measured using the above-described method, the charge DCR was 106 Ω·mg, and the discharge DCR was 82 Ω·mg.

The above results are shown in Table 1.

Comparative Example 1

Lithium phosphate ($Li_3PO_4$), 2 mol of iron (II) sulfate ($FeSO_4$), and phosphoric acid ($H_3PO_4$) were added to 2 L (liter) of water and were mixed with each other such that Li/Fe=3.01 and $H_3PO_4$/Fe=0.04 by molar ratio and the total volume was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 3.5 g of polyethylene glycol as an organic compound, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFePO_4$ and coated with an organic material was obtained.

The obtained granulated body was fired in a non-oxidative gas atmosphere at 700° C. for 1 hour and was held at 40° C. for 30 minutes. As a result, a positive electrode material (B1) was obtained.

When this positive electrode material (B1) was observed with a scanning electron microscope (SEM) and a transmission electron microscope (TEM), plural primary particles were agglomerated to form secondary particles, the surfaces of the primary particles were coated with carbon, and carbon was interposed between the primary particles.

When the lightness L* and the chroma C* of the positive electrode material (B1) were measured according to the above-described method, the lightness L* was 40.5, and the chroma C* was 3.62.

When the specific surface area of the positive electrode material (B1) was measured using the above-described method, the specific surface area was 7.6 m²/g.

When the amount of carbon of the positive electrode material (B1) was measured using the above-described method, the amount of carbon was 0.8% by mass.

When the charge and discharge characteristics of the positive electrode material (B1) were measured using the above-described method, the 3 C discharge capacity was 99.7 mAh/g, and the ratio 3 C capacity/0.1 C capacity was 68.3%.

When the DCR of the positive electrode material (B1) was measured using the above-described method, the charge DCR was 440 Ω·mg, and the discharge DCR was 127 Ω·mg.

The above results are shown in Table 1.

Comparative Example 2

Lithium phosphate ($Li_3PO_4$), lithium hydroxide (LiOH), iron (II) sulfate ($FeSO_4$), manganese (II) sulfate ($MnSO_4$), and phosphoric acid ($H_3PO_4$) were added to 2 L (liter) of water and were mixed with each other such that Li/(Fe+Mn)=3.01, $Li_3PO_4$/(Fe+Mn)=0.95, $FeSO_4+MnSO_4$=2 mol, and Fe:Mn=1:4 by molar ratio and the total amount was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 3.5 g of polyethylene glycol as an organic compound, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFe_{0.25}Mn_{0.75}PO_4$ and coated with an organic material was obtained.

The obtained granulated body was fired in a non-oxidative gas atmosphere at 700° C. for 1 hour and was held at 40° C. for 30 minutes. As a result, a positive electrode material (B2) was obtained.

When the lightness L* and the chroma C* of the positive electrode material (B2) were measured according to the above-described method, the lightness L* was 31.7, and the chroma C* was 3.72.

When the specific surface area of the positive electrode material (B2) was measured using the above-described method, the specific surface area was 10.5 m²/g.

When the amount of carbon of the positive electrode material (B2) was measured using the above-described method, the amount of carbon was 1.1% by mass.

When the charge and discharge characteristics of the positive electrode material (B2) were measured using the above-described method, the 3 C discharge capacity was 104.7 mAh/g, and the ratio 3 C capacity/0.1 C capacity was 68.5%.

When the DCR of the positive electrode material (B2) was measured using the above-described method, the charge DCR was 463 Ω·mg, and the discharge DCR was 135 Ω·mg.

The above results are shown in Table 1.

Comparative Example 3

Lithium phosphate ($Li_3PO_4$), lithium hydroxide (LiOH), iron (II) sulfate ($FeSO_4$), manganese (II) sulfate ($MnSO_4$), cobalt sulfate ($CoSO_4$), and phosphoric acid ($H_3PO_4$) were added to 2 L (liter) of water and were mixed with each other such that Li/(Fe+Mn+Co)=3.01, $Li_3PO_4$/(Fe+Mn+Co)=0.95, Fe:Mn:Co=4:15:1, $FeSO_4+MnSO_4+CoSO_4$=2 mol and the total amount was 4 L (liter). As a result, a uniform slurry-like mixture was prepared.

Next, this mixture was accommodated in a pressure-resistant airtight container having a volume of 8 L (liter), followed by hydrothermal synthesis at 120° C. for 1 hour. As a result, a precipitate was produced. This precipitate was washed with water to obtain a cake-like electrode active material precursor.

Next, 3.5 g of polyethylene glycol as an organic compound, and 500 g of zirconia balls having a diameter of 3 mm as medium particles were added to 150 g (in terms of solid content) of the electrode active material precursor, were mixed with each other, and were dispersed with a ball mill for 12 hours. As a result, a uniform slurry was prepared.

Next, this slurry was sprayed and dried in air at 180° C. As a result, a granulated body having an average particle size of 6 μm which was formed of $LiFe_{0.25}Mn_{0.75}PO_4$ and coated with an organic material was obtained.

The obtained granulated body was fired in a non-oxidative gas atmosphere at 700° C. for 1 hour and was held at 40° C. for 30 minutes. As a result, a positive electrode material (B3) was obtained.

When the lightness L* and the chroma C* of the positive electrode material (B3) were measured according to the above-described method, the lightness L* was 41.9, and the chroma C* was 3.21.

When the specific surface area of the positive electrode material (B3) was measured using the above-described method, the specific surface area was 13.6 m²/g.

When the amount of carbon of the positive electrode material (B3) was measured using the above-described method, the amount of carbon was 0.7% by mass.

When the charge and discharge characteristics of the positive electrode material (B3) were measured using the above-described method, the 3 C discharge capacity was 101.6 mAh/g, and the ratio 3 C capacity/0.1 C capacity was 67.3%.

When the DCR of the positive electrode material (B3) was measured using the above-described method, the charge DCR was 492 Ω·mg, and the discharge DCR was 138 Ω·mg.

The above results are shown in Table 1.

TABLE 1

|  | Composition of Electrode Active Material | Lightness L* | Chroma C* | BET Specific Surface Area (m²/g) | Amount of Carbon (% by mass) | 0.1 C Discharge Capacity (mAh/g) | 3 C Discharge Capacity (mAh/g) | Ratio 3 C Capacity/0.1 C Capacity (%) | Charge DCR (Ω · mg) | Discharge DCR (Ω · mg) |
|---|---|---|---|---|---|---|---|---|---|---|
| Example 1 | LFP | 31.2 | 1.86 | 6.4 | 0.9 | 158.0 | 136.3 | 86.3 | 258 | 99 |
| Example 2 | LFP | 29.2 | 1.29 | 8.1 | 1.0 | 153.0 | 133.0 | 86.9 | 156 | 79 |
| Example 3 | LFP | 25.5 | 0.66 | 10.7 | 1.1 | 154.1 | 134.2 | 87.1 | 109 | 74 |
| Example 4 | LFMP | 32.0 | 1.04 | 11.4 | 0.8 | 152.0 | 124.8 | 82.1 | 260 | 102 |
| Example 5 | LFMP | 12.9 | 0.50 | 11.8 | 1.6 | 146.6 | 113.4 | 77.3 | 100 | 83 |
| Example 6 | LFMCP | 37.3 | 3.32 | 11.1 | 0.8 | 149.5 | 121.9 | 81.6 | 262 | 105 |
| Example 7 | LFMCP | 27.3 | 0.38 | 11.8 | 1.1 | 150.6 | 116.5 | 77.3 | 106 | 82 |
| Comparative Example 1 | LFP | 40.5 | 3.62 | 7.6 | 0.8 | 146.0 | 99.7 | 68.3 | 440 | 127 |
| Comparative Example 2 | LFMP | 31.7 | 3.72 | 10.5 | 1.1 | 152.8 | 104.7 | 68.5 | 463 | 135 |
| Comparative Example 3 | LFMCP | 41.9 | 3.21 | 13.6 | 0.7 | 151.0 | 101.6 | 67.3 | 492 | 138 |

The results of Table 1 are as follows. In the positive electrode materials of Examples 1 to 7, the lightness L* was 12.9 to 37.3, the chroma C* was 0.38 to 3.32, and the specific surface area was 6.4 m²/g to 11.8 m²/g. In the lithium ion secondary batteries using these positive electrode materials, the 3 C discharge capacity was 113.4 or higher, the ratio 3 C capacity/0.1 C capacity was 77.3% or higher, the charge DCR was 100 Ω·mg to 262 Ω·mg, and the discharge DCR was 74 Ω·mg to 105 Ω·mg.

On the other hand, in the positive electrode materials of Comparative Examples 1 to 3, the lightness L* was 31.7 to 41.9, the chroma C* was 3.21 to 3.72, and the specific surface area was 7.6 m²/g to 13.6 m²/g. In the lithium ion secondary batteries using these positive electrode materials, the 3 C discharge capacity was 104.7 or lower, the ratio 3 C capacity/0.1 C capacity was 68.5% or lower, the charge DCR was 440 Ω·mg to 492 Ω·mg, and the discharge DCR was 127 Ω·mg to 138 Ω·mg.

That is, it can be seen that, when the specific surface area of the positive electrode material is 6 m²/g to 20 m²/g, the lightness L* of the positive electrode material is 0 to 40, and the chroma C* is 0 to 3.5, the lithium ion secondary battery using this positive electrode material exhibits good battery characteristics.

INDUSTRIAL APPLICABILITY

In the positive electrode material for lithium ion secondary batteries according to the present invention, the coating degree of the carbonaceous film in the positive electrode material can be checked by controlling the specific surface area, the lightness L*, and the chroma C* to be in the predetermined ranges. Therefore, the battery characteristics of the lithium ion secondary battery using the positive electrode material can be evaluated before the construction of the battery. As a result, the number of entire batteries wasted due to poor battery characteristics can be reduced. In addition, only the positive electrode material for lithium ion secondary batteries in which the coating degree of the carbonaceous film is in the predetermined range can be used. Therefore, the lithium ion secondary battery having good battery characteristics can be manufactured.

The invention claimed is:

1. Positive electrode particles for lithium ion secondary batteries, wherein the positive electrode particles comprise:
   inorganic particles whose surfaces are coated with a carbonaceous film, the inorganic particles being represented by a formula $LiFe_xMn_{1-x-y}M_yPO_4$, wherein $0.05 \leq x \leq 1.0$, $0 \leq y \leq 0.14$, where M represents at least one selected from the group consisting of Mg, Ca, Co, Sr, Ba, Ti, Zn, B, Al, Ga, In, Si, Ge, and rare earth elements,
   an amount of carbon forming the carbonaceous film with respect to 100 parts by mass of the inorganic particles is in a range from 0.8 parts by mass to 2.5 parts by mass,
   the positive electrode material has a specific surface area in a range from 6 m²/g to 20 m²/g,
   a lightness L* in a range from 0 to 40, and
   a chroma C* in a range from 0 to 3.5.

2. A positive electrode for lithium ion secondary batteries, the positive electrode comprising:
   a current collector; and
   a positive electrode mixture layer that is formed on the current collector,
   wherein the positive electrode mixture layer contains the positive electrode particles for lithium ion secondary batteries according to claim 1.

3. A lithium ion secondary battery comprising:
   the positive electrode for lithium ion secondary batteries according to claim 2.

* * * * *